US007063469B2

(12) United States Patent

Nomura et al.

(10) Patent No.: US 7,063,469 B2
(45) Date of Patent: Jun. 20, 2006

(54) IMAGE OUTPUT APPARATUS FOR PROVIDING STABLE OPERATION

(75) Inventors: Tatsuo Nomura, Soraku-gun (JP); Syouichirou Yoshiura, Ikoma-gun (JP); Tsutomu Yoshimoto, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 353 days.

(21) Appl. No.: 10/417,334

(22) Filed: Apr. 17, 2003

(65) Prior Publication Data

US 2005/0008417 A1 Jan. 13, 2005

(30) Foreign Application Priority Data

Apr. 19, 2002 (JP) ............................ 2002-118490
Apr. 19, 2002 (JP) ............................ 2002-118497

(51) Int. Cl.
*B41J 5/30* (2006.01)
*G06F 15/00* (2006.01)

(52) U.S. Cl. ........................................ 400/62; 358/1.15

(58) Field of Classification Search .................. 400/62; 358/1.15, 1.9; 714/47
See application file for complete search history.

(56) References Cited

U.S. PATENT DOCUMENTS

| | | | | |
|---|---|---|---|---|
| 5,844,572 | A * | 12/1998 | Schott | 345/440 |
| 5,961,613 | A * | 10/1999 | DeNicola | 710/18 |
| 6,104,893 | A | 8/2000 | Byeon et al. | 399/66 |
| 6,430,711 | B1 * | 8/2002 | Sekizawa | 714/47 |
| 6,469,805 | B1 * | 10/2002 | Behlok | 358/1.9 |
| 2002/0044298 | A1 * | 4/2002 | Kaneko et al. | 358/1.15 |
| 2002/0105671 | A1 * | 8/2002 | Sugahara | 358/1.15 |
| 2002/0186406 | A1 * | 12/2002 | Phillips et al. | 358/1.15 |
| 2003/0126318 | A1 | 7/2003 | Nomura et al. | |

FOREIGN PATENT DOCUMENTS

| | | | |
|---|---|---|---|
| CN | 1206141 A | | 1/1999 |
| JP | 3-277580 | | 12/1991 |
| JP | 09188042 | * | 7/1997 |
| JP | 11-134142 | | 5/1999 |
| JP | 11-227299 | | 8/1999 |
| JP | 2000-071581 | | 3/2000 |

OTHER PUBLICATIONS

Nomura et al., "Electrically Cotrolled Apparatus", U.S. Appl. No. 10/310,039, filed Dec. 5, 2002, pp. 1-57, Figures 1-25.

Chinese Office Action and English translation thereof mailed Aug. 27, 2004 in corresponding Chinese application No. 03122577.2.

* cited by examiner

*Primary Examiner*—Minh Chau
*Assistant Examiner*—Wasseem H. Hamdan
(74) *Attorney, Agent, or Firm*—Nixon & Vanderhye, P.C.

(57) ABSTRACT

A printing apparatus electronically processes an imput image and outputs the processed image from a recording section. The printing apparatus includes: a managing section which manages an operating status of the printing apparatus; a display section which notifies an administrator of information that recommends confirming expendables used by the recording section to output the image; and a CPU which, based on the information of the operating status of the printing apparatus managed by the managing section, recommends the administrator through the display section to confirm the expendables. As a result, an image output apparatus of the present invention is provided that manages its past operating status, and, based on the managed information, informs the administrator of the operating status in advance, so as to ensure stable operations without arrest.

12 Claims, 14 Drawing Sheets

FIG. 4

DATA LIST OF PRINT OPERATING STATUS

22

| YEAR | MONTH | DATE | DAY | TIMES | MODE | SHEET SIZE | SHEET QUANTITY |
|---|---|---|---|---|---|---|---|
| 2001 | 10 | 1 | MONDAY | 8:53 | COPY | A4 | 21 |
| 2001 | 10 | 1 | MONDAY | 9:20 | COPY | A4 | 5 |
| 2001 | 10 | 1 | MONDAY | 9:33 | PRINT | A4 | 10 |
| 2001 | 10 | 1 | MONDAY | 9:40 | FAX RECEPTION | A4 | 3 |
| 2001 | 10 | 1 | MONDAY | 9:45 | FAX RECEPTION | A3 | 2 |
| 2001 | 10 | 1 | MONDAY | 9:51 | PRINT | A4 | 15 |
| 2001 | 10 | 1 | MONDAY | 10:06 | FAX TRANSMISSION | A4 | 9 |
| 2001 | 10 | 1 | MONDAY | 10:12 | COPY | B5 | 5 |
| 2001 | 10 | 1 | MONDAY | 10:25 | COPY | B5 | 10 |
| 2001 | 10 | 1 | MONDAY | 10:43 | PRINT | A3 | 1 |
| 2001 | 10 | 1 | MONDAY | 10:55 | PRINT | A4 | 8 |
| | | | | | | | |
| | | | | | | | |
| | | | | | | | |
| 2001 | 10 | 2 | TUESDAY | 8:35 | PRINT | A4 | 5 |
| 2001 | 10 | 2 | TUESDAY | 9:10 | PRINT | B4 | 4 |
| 2001 | 10 | 2 | TUESDAY | 9:18 | PRINT | A4 | 26 |
| 2001 | 10 | 2 | TUESDAY | 9:46 | FAX TRANSMISSION | A4 | 11 |
| 2001 | 10 | 2 | TUESDAY | 9:57 | COPY | B5 | 10 |
| | | | | | | | |
| | | | | | | | |
| | | | | | | | |

IMAGE OUTPUT APPARATUS FOR PROVIDING STABLE OPERATION

FIELD OF THE INVENTION

The present invention relates to an image output apparatus that electronically processes an input image and outputs the processed image from recording means. The invention particularly relates to an image output apparatus that manages its operating status to maintain a high operation rate of the image output apparatus.

BACKGROUND OF THE INVENTION

In today's network environment, an electronically controlled apparatus connected to a network is often shared by multiple users. An example of such an electronically controlled apparatus is a network printer. Such a network printer operates to receive a series of jobs from multiple clients and prints out the jobs as requested by the clients in the order they were received. This is a convenient way of automatically making prints of requested jobs.

In recent years, there has been commercialized a complex system that provides a scanner (copier), a facsimile, and a printer in integrated form as a printing apparatus complex. The printing apparatus complex operates such that the printer successively outputs an image that was entered in each mode of the apparatus.

However, the conventional image output apparatus that is shared by multiple users, or that with a plurality of modes (plural paths of image entry) has a deficiency. Namely, it may take time to process a requested new job when the image output apparatus is busy, and particularly when the apparatus is operating at its peak with a plurality of jobs.

Further, operations of the image output apparatus need to be arrested when supplying expendables or replacing and adjusting (checking) components, which needs to be performed regularly to maintain a stable environment for the image output apparatus. However, arresting the operations of the image output apparatus is inconvenient for the users, and, ideally, it should cause as few problems as possible for the users.

A recently proposed management system enables the administrator or users of the image output apparatus to know the operating status of the apparatus. This is achieved by the functions of the image output apparatus whereby the operating history of the apparatus is managed, stored, and displayed or printed out in the form of a list. However, in this management system, the administrator faces a great difficulty in reading the operating status because the system only displays the operating status of the image output apparatus in the form of a list. This is also troublesome for the user of the apparatus when the regular check-up needs to be carried out at the time when the image output apparatus is busy.

An example of such an image output apparatus is disclosed in Japanese Publication for Unexamined Patent Application No. 277580/1991 (Tokukaihei 3-277580; published on Dec. 9, 1991). This publication discloses a printer with an accumulative status display function, in which the operating time of the printer is measured and the number of printer operations is counted, so as to manage the total time each printer is used. This publication merely teaches a technique to find the total operating time of the printer since the time the printer was installed.

Another example is a printer system disclosed in Japanese Publication for Unexamined Patent Application No. 134142/1999 (Tokukaihei 11-134142; published on May 21, 1999).

The printer system disclosed in this publication enables each client to confirm the current operating status of the printer. The publication merely teaches a technique that enables the client to ascertain the current operating status of the printer.

Further, Japanese Publication for Unexamined Patent Application No. 227299/1999 (Tokukaihei 11-227299; published on Aug. 24, 1999) discloses a printing apparatus which manages operating history information, including total print counts, daily print counts, the number of processed jobs, the number of paper jams, or the frequency of paper jams, so as to report the managed information upon request. This publication merely teaches a technique in which the past operating status is managed in the form of data and the data is reported upon request.

Yet another example is a printing system disclosed in Japanese Publication for Unexamined Patent Application No. 71581/2000 (Tokukai 2000-71581; published on Mar. 7, 2000). In this printing system, the print history is stored in the form of data, and an amount of expendable to be used is calculated from the data of print history, so as to project a time frame in which the replacement of the expendable will be required. This publication merely teaches a technique in which the amount of expendable consumed or left is calculated based on the history of printer operations, so as to project a time frame in which the expendable will be empty and inform the administrator of the projection.

SUMMARY

An object of the present invention is to provide an image output apparatus that manages its operating status so as to ensure, based on the managed information, stable operations without arrest.

In order to achieve this object, an image output apparatus of the present invention includes: an input processing section for electronically processing input image; a recording section for outputting the processed image; a managing section for managing an operating status of the image output apparatus; and a maintenance control section for controlling the image output apparatus based on information of the operating status of the image output apparatus managed by the managing section, so as to notify an administrator of the image output apparatus of information that relates to maintenance of the image output apparatus or to make the administrator carry out maintenance of the image output apparatus.

Note that, as the term is used herein, "maintenance" refers to the act of maintaining proper operations of the image output apparatus, including, for example, replacement of expendables, adjustment of image quality, check-up, and repair.

According to the present invention, the image output apparatus electronically processes the input image and outputs the processed image from the recording section.

In the image output apparatus of the present invention, the image output from the recording section requires expendables, for example, such as a toner in the toner cartridge, recording sheets, and other replacement parts. It would be inconvenient for many users if the expendables are used up and need to be replenished or replaced when the image output apparatus is busy.

It is preferable that an image quality of output images be adjusted by adjusting image forming conditions of the recording section when, for example, a predetermined number of image outputs has been made by the recording section.

To this end, the present invention includes the managing section that manages the operating status of the image output apparatus. Using the data of the operating status of the image output apparatus managed by the managing section, it is possible to ascertain a time the image output apparatus is busy, which may be a period of a day, a week, a month, or a year, for example.

In the present invention, the maintenance control section notifies the administrator of information that related to maintenance of the image output apparatus, or makes the administrator carry out maintenance of the image output apparatus, based on the information of the operating status of the image output apparatus managed by the managing section.

Thus, using the information of the managing section, it is possible to notify the administrator of the information that relates to the operating status of the image output apparatus, or make the administrator carry out maintenance of the image output apparatus, before the image output apparatus becomes busy.

As a result, the image output apparatus of the present invention is provided that manages its operating status so as to ensure, based on the managed information, stable operations without arrest.

The image output apparatus of the present invention further includes a notifying section for notifying the administrator of information that recommends confirmation of an expendable that is used for the image output by the recording section, the maintenance control section controlling the notifying section to recommend confirmation of the expendable, based on the information of the operating status of the image output apparatus.

According to this invention, using the information of the managing section, the notifying section can recommend the administrator to confirm if there is enough expendable left for the recording section to output an image, before the image output apparatus becomes busy.

That is, according to the present invention, a projection of a future operating status of the image output apparatus is made based on the past operating status, so as to recommend confirming the expendable before the operating status hits the peak. This enables the administrator to confirm a remaining quantity of toner or a stock of sheets or replacement parts in advance, thereby minimizing the arrest of operations due to a shortage of expendable. This is advantageous both for the administrator and the user of the image output apparatus.

As a result, the image output apparatus of the present invention is provided that manages its operating status so as to ensure, based on the managed information, stable operations without arrest.

The image output apparatus of the present invention further includes: an image quality adjusting section for adjusting image forming conditions of the recording section, so as to adjust an image quality of the output image, the maintenance control section controlling the image quality adjusting section, so as to adjust the image forming conditions of the recording section based on the information of the operating status of the image output apparatus.

According to the present invention, by the provision of the image quality adjusting section, image forming conditions of the recording section can be adjusted to adjust an image quality of the output image, when, for example, a predetermined number of images has been outputted by the recording section.

Meanwhile, adjusting image forming conditions by the image quality adjusting section may cause a trouble for many users when the adjustment, which takes some time to complete, is carried out when the image output apparatus is busy.

This is prevented in the present invention by the maintenance control section, which controls the image quality adjusting section so as to adjust image forming conditions of the recording section based on the information of the operating status of the image output apparatus managed by the managing section.

Using the information of the managing section, the image quality adjusting section can adjust the image forming conditions of the recording section. That is, a future operating status of the image output apparatus is projected based on the past operating status, and the recording section carries out an automated image quality adjusting process before the operating status hits the peak. This is also advantageous for the users because it ensures a desired level of image quality of a recorded image even when the image output apparatus is busy.

As a result, the image output apparatus of the present invention is provided that manages its operating status so as to ensure, based on the managed information, stable operations without arrest.

The image output apparatus of the present invention further includes: a communication section for sending and receiving data to and from an external electronic device, the maintenance control section controlling the communication section, so as to notify the administrator of information that recommends confirmation of the expendable or the remaining amount of the expendable via the communication section with respect to the external electronic device.

The image output apparatus of the present invention further includes: a communication section for sending and receiving data to and from an external electronic device, the maintenance control section controlling the communication section, so as to notify the administrator of information that recommends checking the recording section via the communication section with respect to the external electronic device.

According to the present invention, there is further provided a communication section for sending and receiving data to and from an external electronic device, and the maintenance control section notifies the administrator of information that recommends confirmation of the expendable or of the remaining amount of the expendable, or notifies the administrator of information that recommends checking the recording section, via the communication section with respect to the external electronic device.

Thus, a notification, such as e-mail, can be sent to the electronic device, for example, such as a service center via the communication section, even when, for example, the administrator of the image output apparatus is not present at the location of the image output apparatus.

This is advantageous both for the administrator and the user of the image output apparatus because a form of notification can be suitably selected according to the way the image output apparatus is managed.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a drawing showing an operating status managing table in a managing section of the printing apparatus.

DESCRIPTION OF THE EMBODIMENTS

First Embodiment

One embodiment of a printing apparatus is described below with reference to FIG. 1 through FIG. 11.

Figure 2:
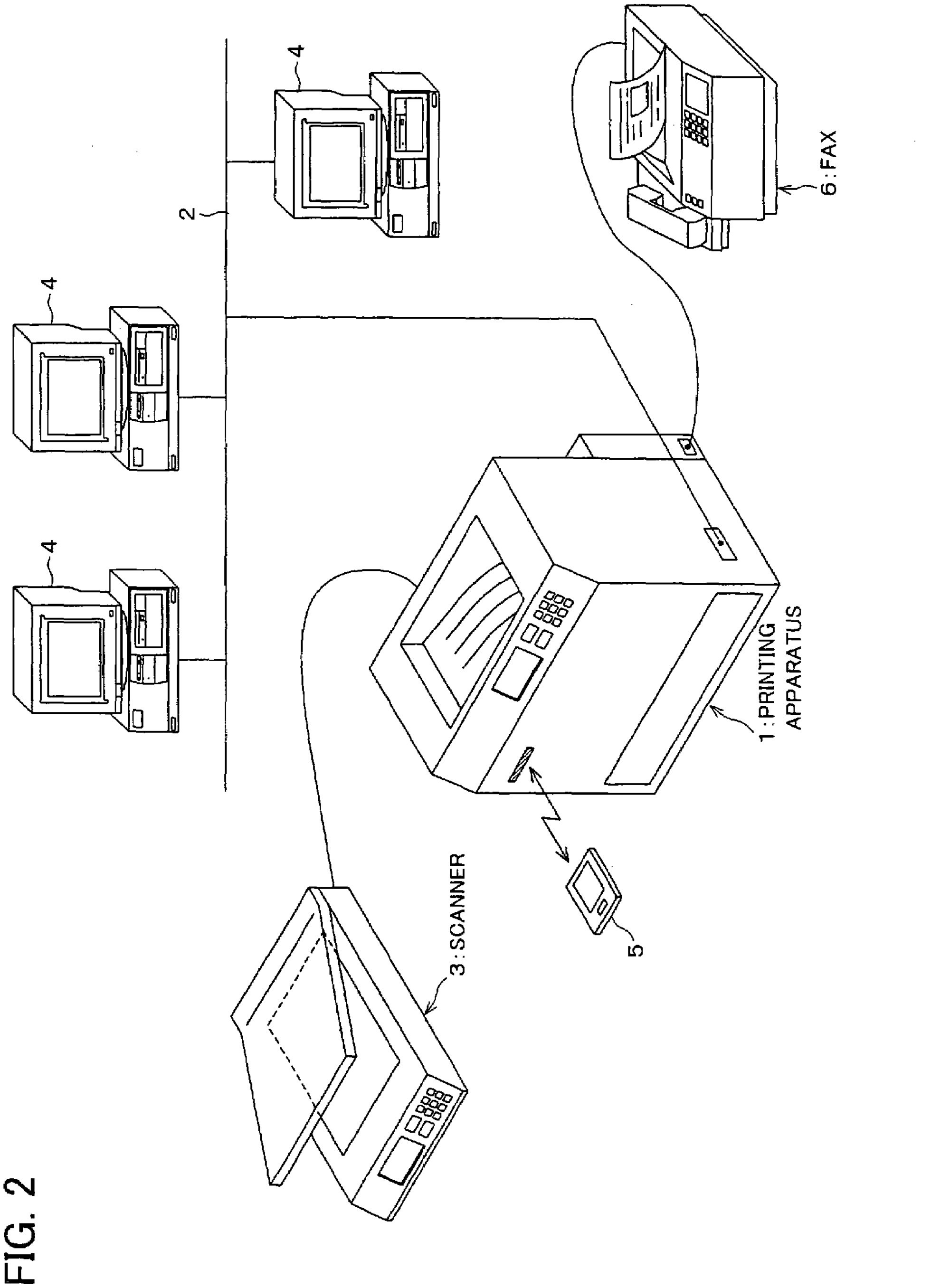
FIG. 2 is a perspective view of the overall system structure.

As shown in FIG. 2, a printing apparatus 1 as an image output apparatus of the present embodiment is connected to a network. Specifically, the printing apparatus 1 is connected, at all times or upon request, to various types of electronic apparatuses or devices, including, for example, a scanner apparatus 2, personal computers 4, a PDA terminal 5, and an externally provided facsimile apparatus 6, via a communication path such as a network 2. The printing apparatus 1 is able to successively make prints of image data that are transmitted from these electronic apparatuses or device.

The printing apparatus 1 of the present embodiment, working in this environment, manages its operating status as operating status information. In response to a request for the confirmation of the operating status, the printing apparatus 1 refers to the operating status information being managed and presents the operation rate of the printing apparatus 1 in an easily recognizable form, for example, in the form of a graph.

Figure 1:
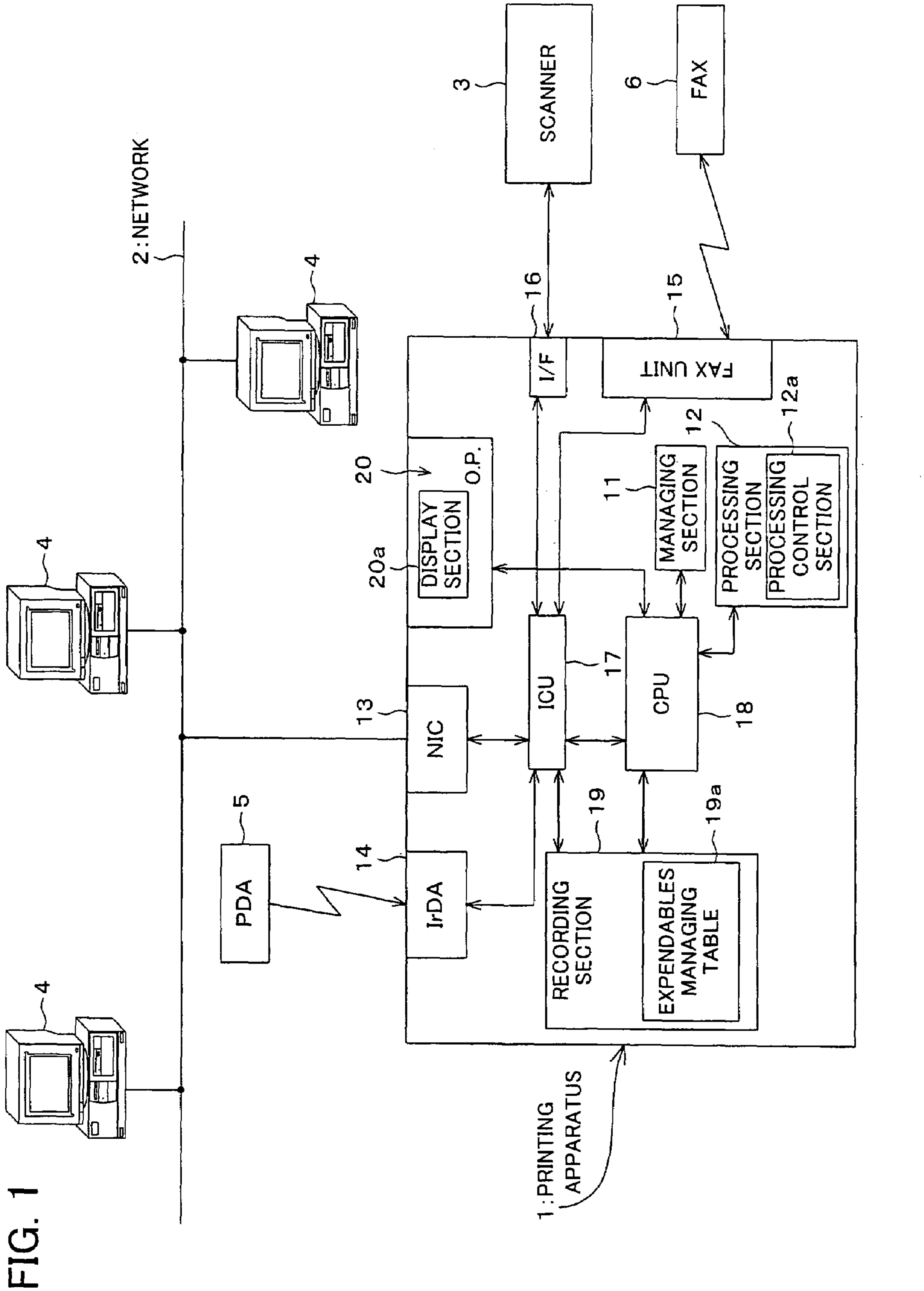
FIG. 1 is a block diagram of an overall system structure of printing apparatuses connected to a network according to one embodiment of an image output apparatus.

For this purpose, the printing apparatus 1 is provided with a managing section 11, which manages the operating status of the printing apparatus 1, and a processing section 12, which creates a graphical representation of the operating status based on the operating status information managed by the managing section 11, as shown in FIG. 1. The printing apparatus 1 is additionally provided with various types of peripheral apparatuses or devices, such as the personal computers 4, which may be connected to the printing apparatus 1 via the network 2.

The printing apparatus 1 is equipped with an interface (communicating means), which may be realized by a network card such as a NIC (network Interface Card) 13, so as to enable the printing apparatus 1 to communicate with the apparatuses or devices on the network 2. The connections may be wireless or cable communications. The printing apparatus 1 is also equipped with a wireless communications interface such as a ratio communication interface 14 that complies with the specifications under IrDA (Infrared Data Association), so as to enable the printing apparatus 1 to output images through such an interface by temporarily making a connection as required. The radio communication interface may also be realized by Bluetooth (registered trademark), for example. Further, the printing apparatus 1 is able to send and receive images to and from the externally provided facsimile apparatus 6 via a FAX unit 15. The printing apparatus 1 is also able to carry out a print job in a copy mode by receiving image data via an I/F (interface) 16 from the scanner apparatus 3 which creates image data of a document.

The image data that was send from the external apparatus or device 3, 4, 5, 6 and received through the interface 13, 14, 15, 16 is fed to an ICU (Image Control Unit) 17 (image processing means) where image processing is carried out. Based on this image data, a recording section 19 (recording means, image quality adjusting means) carries out a recording operation.

The CPU 18 controls various components of the printing apparatus 1. More specifically, the CPU 18 controls each of those components that are involved in the image forming processes of the recording section 19, so that an image can be recorded based on the image data sent from the ICU 17.

Another function of the CPU 18 is to manage an operation panel (O.P.) 20 that is equipped with a display section 20*a*, the display section 20*a* being provided with a transparent touch panel on its upper face to comprise notifying means. In managing the operation panel 20, the CPU 18 ascertains the content of input instructions from an operator, so as to control operations of the printing apparatus 1. In addition, the CPU 18 manages the display panel 20 to control display operations, whereby the operator is notified of guidance information of the printing apparatus 1.

Further, the CPU 18 processes image data based on operation instructions entered through the operation panel 20, or image input instructions entered through the interface 13, 14, 15, 16. That is, the CPU 18 manages operations of those components involved in the image forming processes, in addition to controlling the image forming processes that send out operating instructions. In this way, the CPU 18 serves as maintenance control means of the present invention.

In the present embodiment, the components of the image forming processes are managed by providing sensors, where required, that detect motion, for example, and by finding a state of each component based on a detected signal from the sensor. For example, the sensor may be a toner sensor that detects a remaining amount of developer (toner) in a developing device (not shown), or a sheet sensor that detects a remaining quantity of recording medium (sheet) in a sheet cassette. Another example of the sensor is a life counter that manages the life of an electrophotographic process for recording images. The data detected by these sensors are managed by being constantly updated in an expendables managing table 19*a* (confirmation means) that is stored in a memory (not shown) of the recording section 19. The managed data in the expendables managing table 19*a* can be confirmed as required to obtain a state of each component, thereby finding the amount of remaining toner or remaining sheet.

The managing section 11 constantly manages the operating status of the printing apparatus 1 to obtain operating status information. The operating status information, which indicates the operating status as it is managed, is stored in the managing section 11.

The processing section 12 has a function of representing the operating status of the printing apparatus 1 in graphic display. For example, the processing section 12 creates a graph whose horizontal axis represents time, as will be described later.

Figure 3:
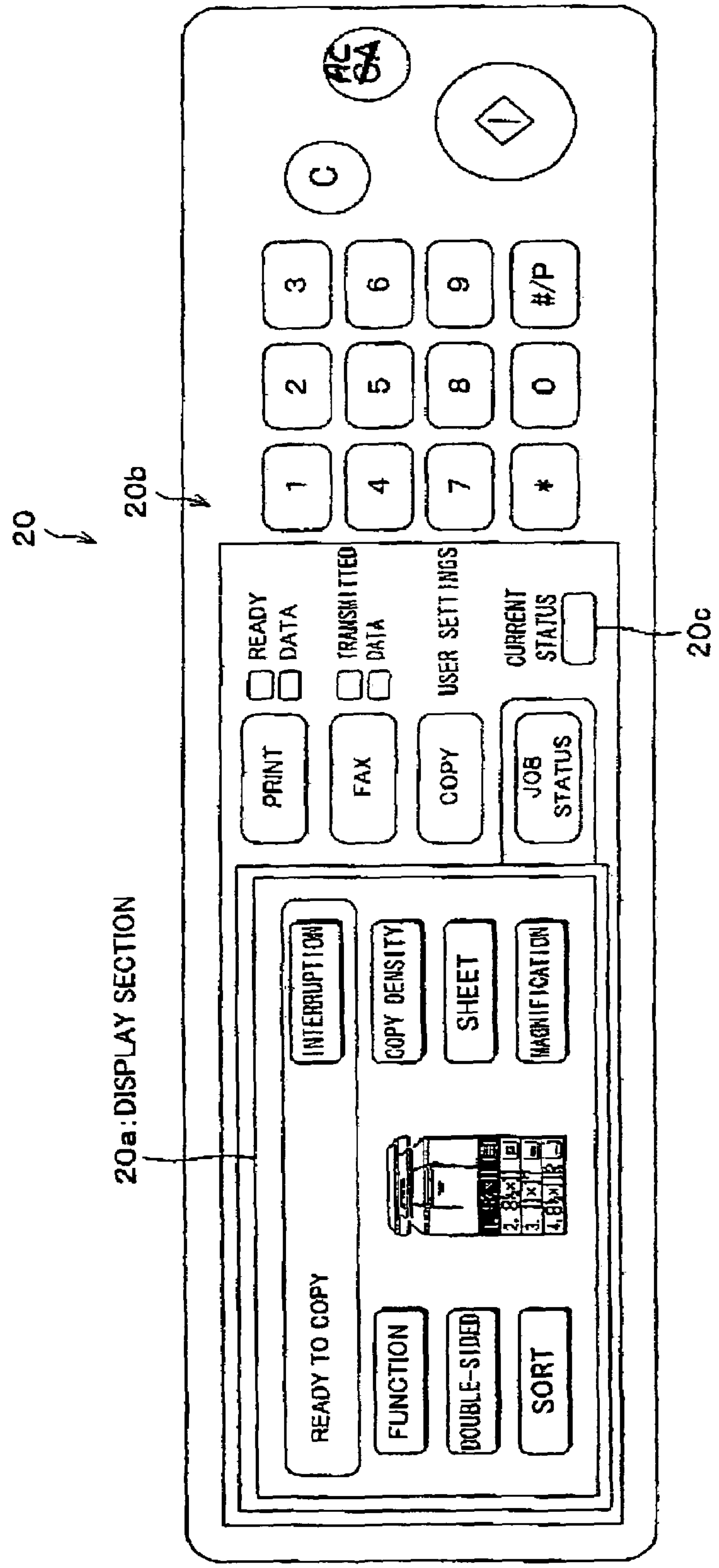
FIG. 3 is a plan view of an operation panel of the printing apparatus.

The operation panel 20 of the printing apparatus 1 has the display section 20*a* and an operating section 20*b,* as shown in FIG. 3. Specifically, a liquid crystal display panel of a dot-matrix type, for example, is provided as the display section 20*a* on the left side of the operation panel 20. On the upper face of the display section 20*a* is a transparent touch panel (tablet). Touching a portion of the display section 20*a* with a finger where the liquid crystal display panel displays a key activates the key and causes a mode signal to enter the CPU 18. When touched, the keys of the display section 20*a* change their displayed form to indicate that they have been activated. Further, the liquid crystal display panel is designed such that the entire display screen scrolls horizontally and vertically as required.

On the right side of the operation panel 20 are provided various keys, including mode selecting keys, a job status key, numeric keys, a clear (C) key, an all clear (AC) key, and a print key. The mode selecting keys, which correspond to a PRINT mode, a FAX mode, and a COPY mode of the printing apparatus 1, are provided to select an operating mode of the printing apparatus 1. The job status key is provided to check the progress of the print job. The numeric keys are provided to enter a quantity of prints. The clear (C) key is used to partially clear a mode. The all clear (AC) key is used to completely clear a mode. The print key is used to instruct a start of a print job.

To the right of the job status key is disposed a current status key 20*c*. One feature of the present embodiment is that the current status key 20*c* is used to instruct the printing apparatus 1 to display an operating status of the printing apparatus 1. By operating the current status key 20*c,* a graphical representation of the operating status is created in the form of a graph in the display section 20*a* of the operation panel 20.

FIG. 4 shows an operating status managing table 22 as one example of an operating status managed data of the printing apparatus 1 managed by the managing section 11.

Examples of information managed by the operating status managing table 22 include time, path (mode) of entry, document size information, image size information, sheet size information, and a print quantity, with respect to each job for successively processing image data that is entered through each interface. The number of managing headings may be increased or decreased as need arises. (For example, a status of a post-processing device with respect to printed sheets may be added.)

Figure 5:
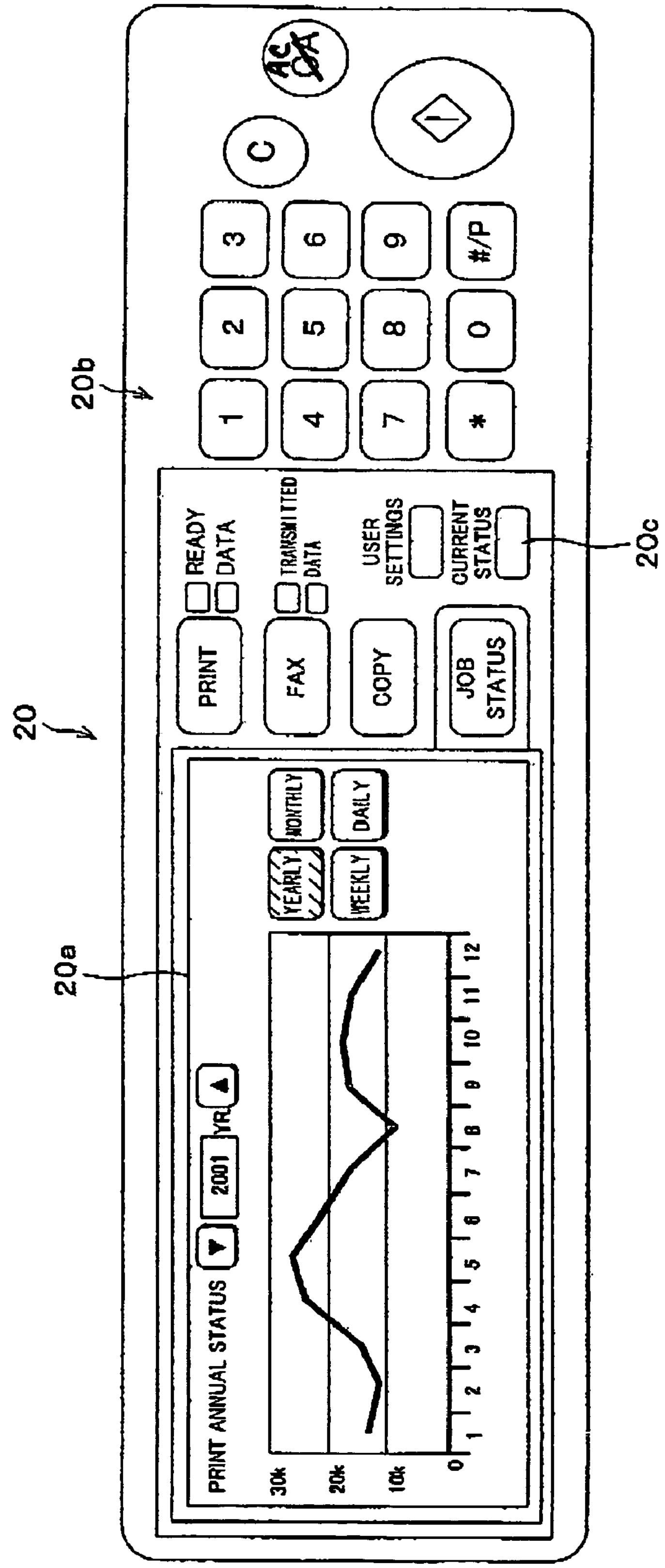
FIG. 5 is a plan view of a display section, showing an example of graphic display of an annual operating status (print counts).

FIG. 5 shows an example of graphic display. The processing section 12 of the printing apparatus 1 carries out data processing to create graphical display of counted data of each month based on the operating status managed data, and the result of data processing is displayed in the display section 20*a.* In this way, the processing section 12 of the printing apparatus 1 creates a graphical representation of the operating status based on the operating status managed data stored in the operating status managing table 22, so that the operating status of the printing apparatus 1 within a predetermined time period, which may be daily, weekly, monthly, or yearly, can be ascertained at a glance.

As described, operating the current status key 20*c* of the operation panel 20, when accompanied by a request for graphic display of the operating status of the printing apparatus 1, causes the processing section 12 to create a graph based on the information managed by the managing section 11.

The information of the operating status is displayed in the form of a graph in the display section 20*a* of the operator panel 20 by the CPU 18. The graphic information of the operating status, other than being displayed in the display section 20*a,* may be outputted as a print image from the recording section 19 of the printing apparatus 1, or outputted to an electronic apparatus, such as the externally provided personal computer 4, which can communicate with the printing apparatus 1 via a network.

The graph of the operating status is designed such that the operation rate of the apparatus can be grasped on the basis of a time scale or time, using the horizontal axis as a time axis. Further, the horizontal axis representing time can be switched to show different time scales, such as day, week, month, and year, so that an operating status of a predetermined time period can be grasped. That is, it is possible to create a graph of an operating status of the printing apparatus 1 within a specific time period.

Figure 6:
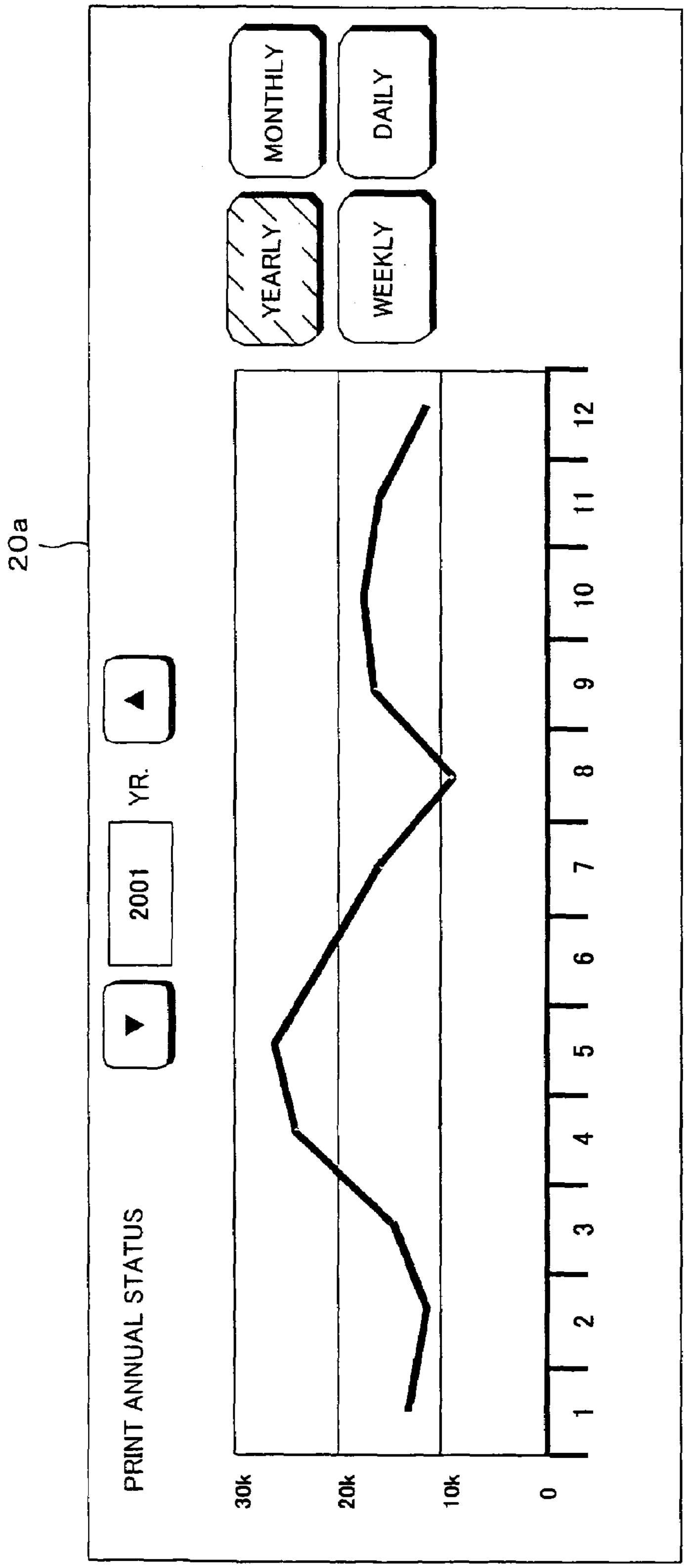
FIG. 6 is a magnified view of the display section of the operation panel of FIG. 5.

For example, FIG. 6 shows a graph of an annual operating status (the same screen as that shown in FIG. 5). Shown in the display screen of FIG. 6 is level display of the operating status in year 2001, which was obtained by counting an operating status on a monthly basis.

Figure 7:
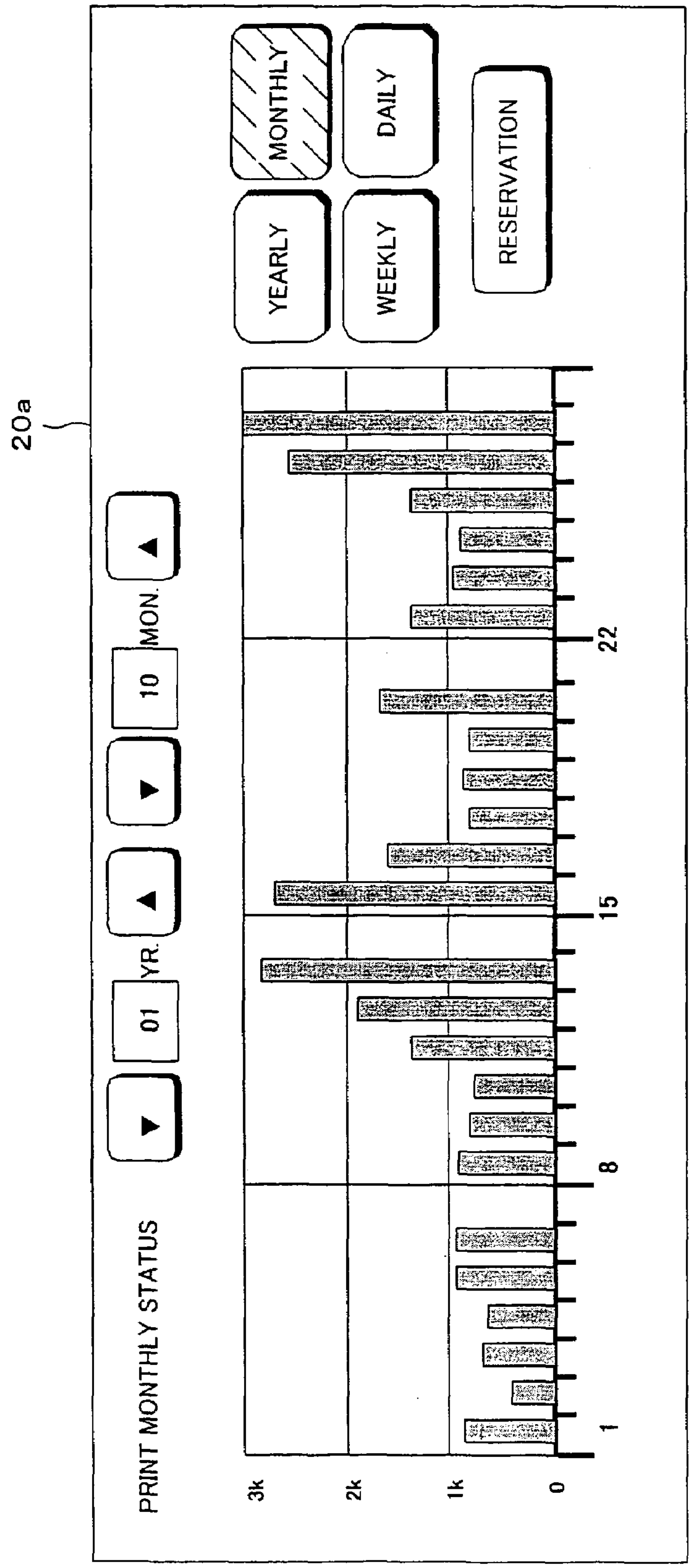
FIG. 7 is a plan view of the display section, showing one example of graphic display of a monthly operating status (print counts).

FIG. 7 is a graph of a monthly operating status. Shown in the display screen of FIG. 7 is level display of the operating status in October 2001, which was obtained by counting an operating status on a daily basis.

Figure 8:
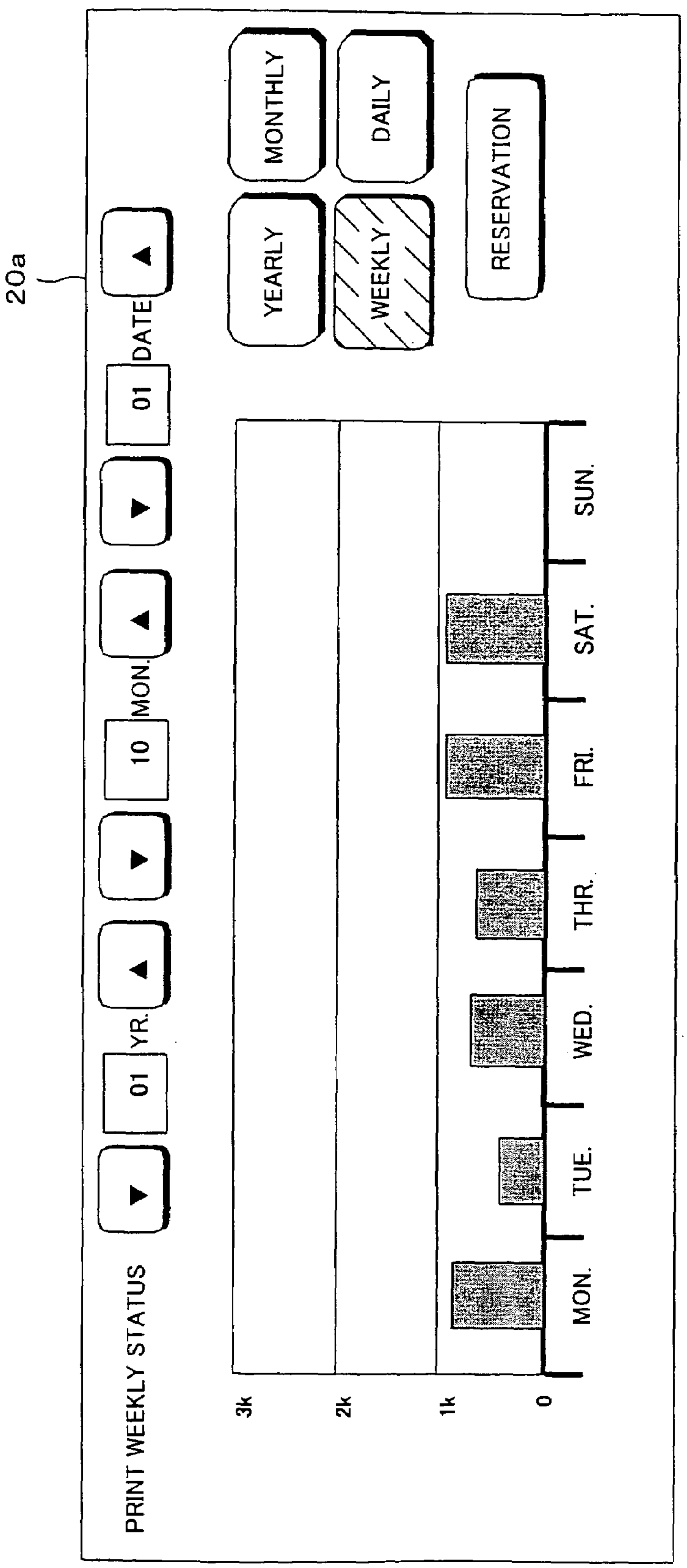
FIG. 8 is a plan view of the display section, showing one example of graphic display of a weekly operating status (print counts).

FIG. 8 is a graph of a weekly operating status. Shown in the display screen of FIG. 8 is level display of the operating status in the first week of October 2001, which was obtained by counting an operating status on a weekly basis.

Figure 9:
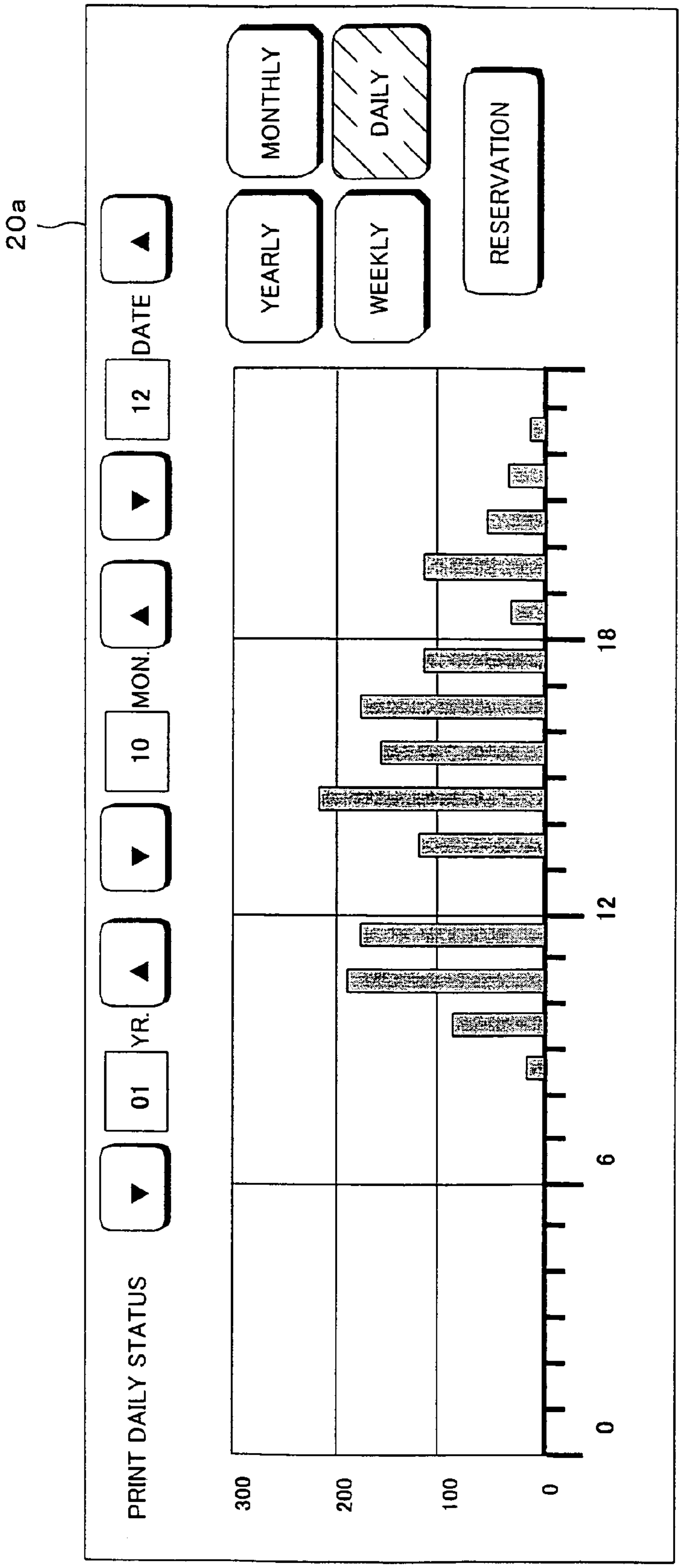
FIG. 9 is a plan view of the display section, showing one example of graphic display of a daily operating status (print counts).

FIG. 9 is a graph of a daily operating status. Shown in the display screens of FIG. 9 is level display of the operating status in a day, which was obtained by counting an operating status of Oct. 12, 2002 on an hourly basis.

As described, operating the current status key 20*c* on the operation panel 20 causes the processing section 12 in the printing apparatus 1 to create a graphical representation of the operating status of the printing apparatus 1 in a given time scale, so that the user who has requested the information can confirm the operating status of the printing apparatus 1 through, for example, the display section 20*a* of the operation panel 20.

Further, in the present embodiment, the function of the processing section 12 to create a graph of the operating status may be used to project a future operating status, so as to recommend the administrator or users to check the expendable.

Specifically, a projection of a future operating status is made based on the past operating status managed by the managing section 11, and the administrator or user is asked to check a remaining quantity of expendables required for the printing apparatus 1.

More specifically, for example, in the monthly operating status shown in FIG. 7 that was created by confirming the operating status of the printing apparatus 1 in the processing section 12, it can be seen that the operation rate of the printing apparatus 1 increased from day 11 and from day 25. The projected high operation rate from day 11 and from day 25 is notified to the administrator in advance to recommend the administrator to check the expendable. The notification is given in the form of time information at an appropriate timing, for example, the day before day 11 and day 25, or first thing in the morning on day 11 and day 25.

Here, the confirmation and projection of the high operation rate, for example, in day 11 and day 25 are carried out in a processor control section 12*a* of the processing section 12. Specifically, based on the monthly operating status managed by the managing section 11, the processor control section 12*a* finds day in which the number of prints exceeds 1000 (1 k) a day. In this example, the processor control section 12*a* finds a row of, for example, 3 days or longer in which the number of prints exceeds 1000 (1 k) a day. The increased operation rate in day 11 and day 25 is confirmed and projected in this manner.

Figure 10:
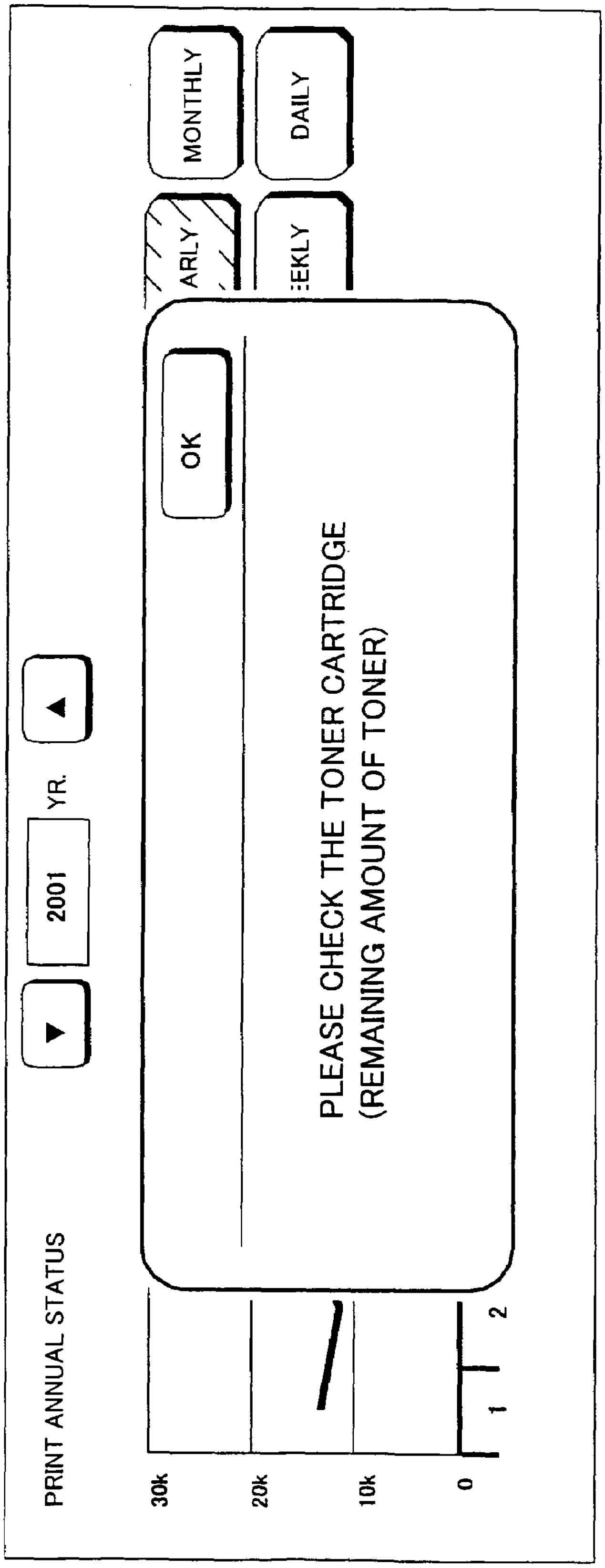
FIG. 10 is a plain view of the display section showing graphic display of an annual operating status (print counts), recommending checking an expendable.

FIG. 10 is a display on the operation panel 20 of the printing apparatus 1, showing a message that recommends confirming the expendable. By confirming this information, the administrator is able to check the status of the printing apparatus 1 before the printing apparatus 1 becomes busy. For example, the administrator is able to confirm the expendables managing table 19*a* of the recording section 19 to find the status of the printing apparatus 1, for example, such as a remaining quantity of expendables in the printing apparatus 1 or a stock of spare expendables. This enables the administrator to replenish or purchase expendables as required. As a result, the printing apparatus 1 can operate stably.

Note that, the foregoing described the case where the operating status of the printing apparatus 1 is projected based on the operating status in October 2001. However, the projection of operating status may be given based on managed data of several months, for example.

Further, the projection may be given on a weekly basis or a daily basis, instead of a monthly basis. That is, the unit scale of the reference data can be changed according to such factors as the operating status of the printing apparatus 1 or the management level of the printing apparatus 1.

Note that, in the present embodiment, a projection of high operation rate of the printing apparatus 1 is notified on the display section 20*a* of the operation panel 20 of the printing apparatus 1, so as to recommend confirming the expendables in advance. However, the present invention is not just limited to this implementation. For example, in an environment where the printing apparatus 1 is connected to the network 2, the notification can be transmitted to various destinations, such as a network administrator, an apparatus administrator, and a service center, using and e-mail function of the printing apparatus 1.

Figure 11:
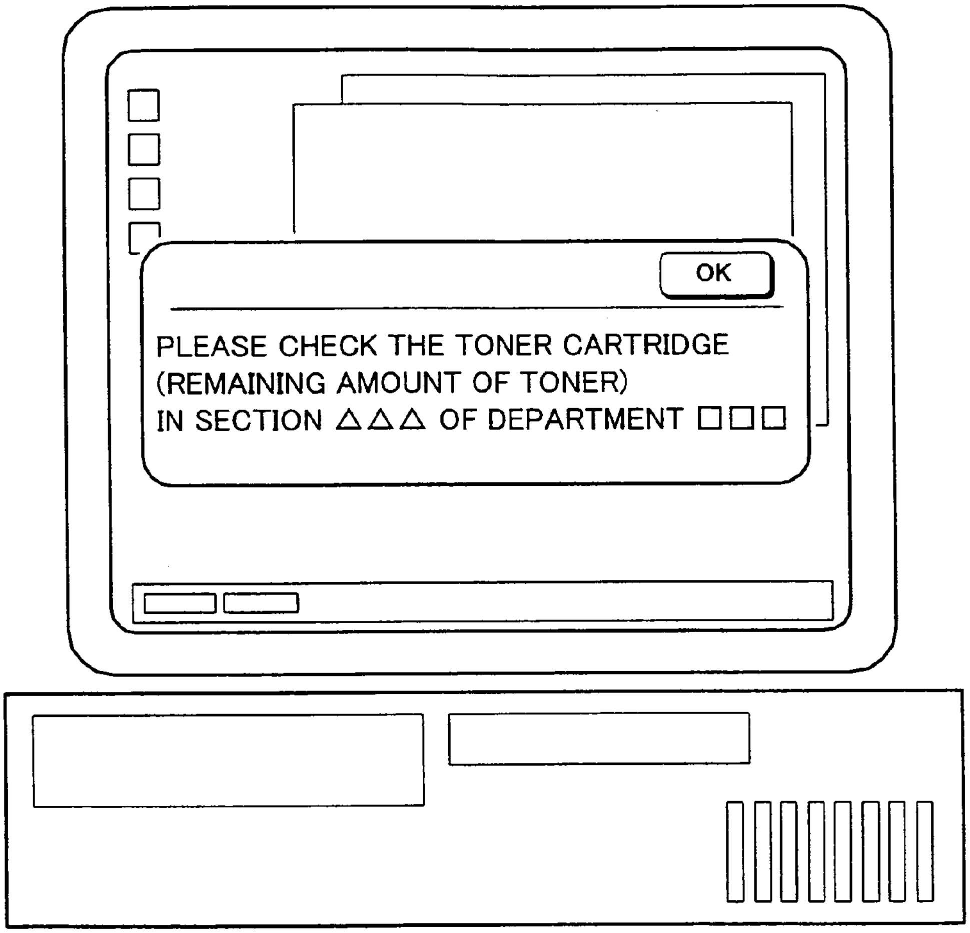
FIG. 11 is a plan view showing a display recommending an external personal computer to check the expendable.

The way the information is presented, i.e., whether the information should be displayed on the display section 20*a* of the printing apparatus 1 or transmitted to an external administrator terminal such as the personal computer 4 of the printing apparatus 1 as shown in FIG. 11 may be selected according to the system of management and the environment where the printing apparatus 1 is provided.

Further, in this example, the expendable of the printing apparatus 1 is an amount of remaining toner in a toner cartridge. Instead, the expendable may be a quantity of remaining recording sheets in a sheet storing cassette. Other examples of expendables include strips of a stapler that are required for recording.

In the manner described above, the printing apparatus 1 of the present embodiment electronically processes an input image and outputs a resulting image from the recording section 19.

In the printing apparatus 1, the image output from the recording section 19 requires expendables, for example, such as a toner in the toner cartridge, recording sheets, and other replacement parts. It would be inconvenient for many users if the expendables are used up and need to be replenished or replaced when the printing apparatus 1 is busy.

In order to avoid this, in the present embodiment, the managing section 11 manages the operating status of the printing apparatus 1. Thus, by referring to the data of the operating status of the printing apparatus 1 managed by the managing section 19, it is possible to ascertain a period of high operation rate of the printing apparatus 1, which may be daily, weekly, monthly, or annually, for example.

Further, in the present embodiment, the CPU 18 notifies the administrator to confirm the expendables through the display section 20*a* based on the information of operating status of the printing apparatus 1 managed by the managing section 11.

Thus, using the information from the managing section 11, it is possible to notify the administrator through the display section 20*a* to confirm the expendables if there is enough quantity left for the recording section 19 to output an image, before the printing apparatus 1 becomes busy.

That is, a projection of a future operating status of the printing apparatus 1 is made based on the past operating status, so as to recommend confirming the expendables before the operating status hits the peak. This enables the administrator to confirm a remaining quantity of toner to a stock of sheets or replacement parts in advance, thereby minimizing the arrest of operations due to a shortage of expendables. This is advantageous both for the administrator and the user of the printing apparatus 1.

By thus managing the operating status of the printing apparatus 1 and presenting the managed information in advance, the printing apparatus 1 can be ensured to operate stably without arrest.

The printing apparatus 1 of the present embodiment is further provided with an NIC 13 through which data can be sent and received to and from the externally provided personal computer 4. Via the NIC 13, the CPU 18 notifies the personal computer 4 of information, for example by e-mail, that recommend confirming the expendable.

Thus, a notification, such as e-mail, can be sent to the personal computer 4, for example, such as a service center, via the NIC 13, even when, for example, the administrator of the printing apparatus 1 is not present at the location of the printing apparatus 1.

This is advantageous both for the administrator and the user of the printing apparatus 1 because a form of notification to confirm the expendable can be suitably selected according to the way the printing apparatus 1 is managed.

Second Embodiment

Another embodiment of the present invention is described below. Note that, for convenience of explanation, constituting elements having the same functions as those described with reference to the drawings in the foregoing First embodiment are given the same reference numerals and explanations thereof are omitted here.

The present embodiment takes into consideration detected data of a remaining toner amount as an expendable.

The recording section 19 of the printing apparatus 1 is equipped with a remaining toner amount detecting sensor (not shown), which is conventionally known. The remaining tone amount detecting sensor is able to find a level of remaining tone amount in the printing apparatus 1. The information of remaining toner amount is listed in the expendables managing table 19*a* (confirmation means, see FIG. 1) in the recording section 19, as described in the First Embodiment.

The present embodiment judges whether the amount of remaining toner has fallen below a predetermined level, or, if the amount of remaining toner can be accurately confirmed, whether the detected amount of remaining toner is sufficient, prior to day 11 and day 25 from which the operation rate of the printing apparatus 1 is expected to increase as shown in FIG. 7. If the amount of remaining toner is judged to be insufficient, the result of judgment is presented to the display section 20*a* of the printing apparatus 1, or to the terminal of the administrator, using the personal computer 4, as shown in FIG. 10 or FIG. 11.

Note that, as in the foregoing First Embodiment, the amount of remaining toner in the toner cartridge is an example of an expendable of the printing apparatus 1 in the present embodiment. However, the present invention is not just limited to this implementation. For example, the expendable may be the quantity of recording sheets remaining in a recording sheet storing cassette. Other examples of expendables include strips of a stapler that are required for recording.

As described, in a management system of the present embodiment, a future operating status is projected from the past operating status, so as to recommend the administrator or users to confirm the expendable. Thus, by activating the management system on a regular basis, i.e., at predetermined timings, it is possible to ensure stable operations of the printing apparatus 1 at all times.

In the foregoing First Embodiment, the administrator or user is simply recommended to confirm the expendable based on the information of the operating status of the printing apparatus 1 managed by the managing section 11, but not directly from the information of remaining quantity of expendables. Thus, in the event where the toner has been replenished only recently for example, it is not necessarily required to recommend the administrator or user to confirm the expendable, even when the operation rate is expected to increase.

In the present embodiment, however, the recording section 19 is provided with an expendables managing table 19*a,* which is used to confirm the current amount of expendables. Based on the current amount of expendables confirmed by the expendables managing table 19*a,* the CPU 18 controls the timing of presenting the information to the display section 20*a*.

Thus, in addition to projecting a future operating status of the printing apparatus 1 based on the past operating status, it is also possible to optionally control the timing of notifying the administrator or user to confirm the expendables based on the current amount of remaining expendables.

The printing apparatus 1 of the present embodiment is further provided with an NIC 13 through which data can be sent and received to and from the externally provided personal computer 4. Via the NIC 13, the CPU 18 notifies the personal computer 4 of information that recommend confirming the current amount of remaining expendables.

Thus, the current amount of remaining expendables can be notified in the form of, for example, e-mail to the personal computer 4, for example, such as a service center, via the NIC 13, even when, for example, the administrator of the printing apparatus 1 is not present at the location of the printing apparatus 1.

This is advantageous both for the administrator and the user of the printing apparatus 1 because a form of notification to confirm the expendable can be suitably selected according to the way the printing apparatus 1 is managed.

Third Embodiment

Yet another embodiment of the present invention is described with reference to FIG. 12 through FIG. 14. Note, that, for convenience of explanation, constituting elements having the same reference numerals as those described with reference to the drawings in the foregoing First and Second Embodiments are given the same reference numerals and explanations thereof are omitted here.

In an image output apparatus of the present embodiment, the processing control section 12*a* of the processing section 12, as shown in FIG. 1, is able to confirm and project high operation rate of the image output apparatus, for example, from day 11 and from day 25, as described in the First Embodiment.

In addition, knowing the high operation rate from day 11 and from day 25, the image output apparatus of the present embodiment automatically adjusts the electrophotographic processes in advance, so as to stabilize the quality of recorded and reproduced images.

Figure 12:
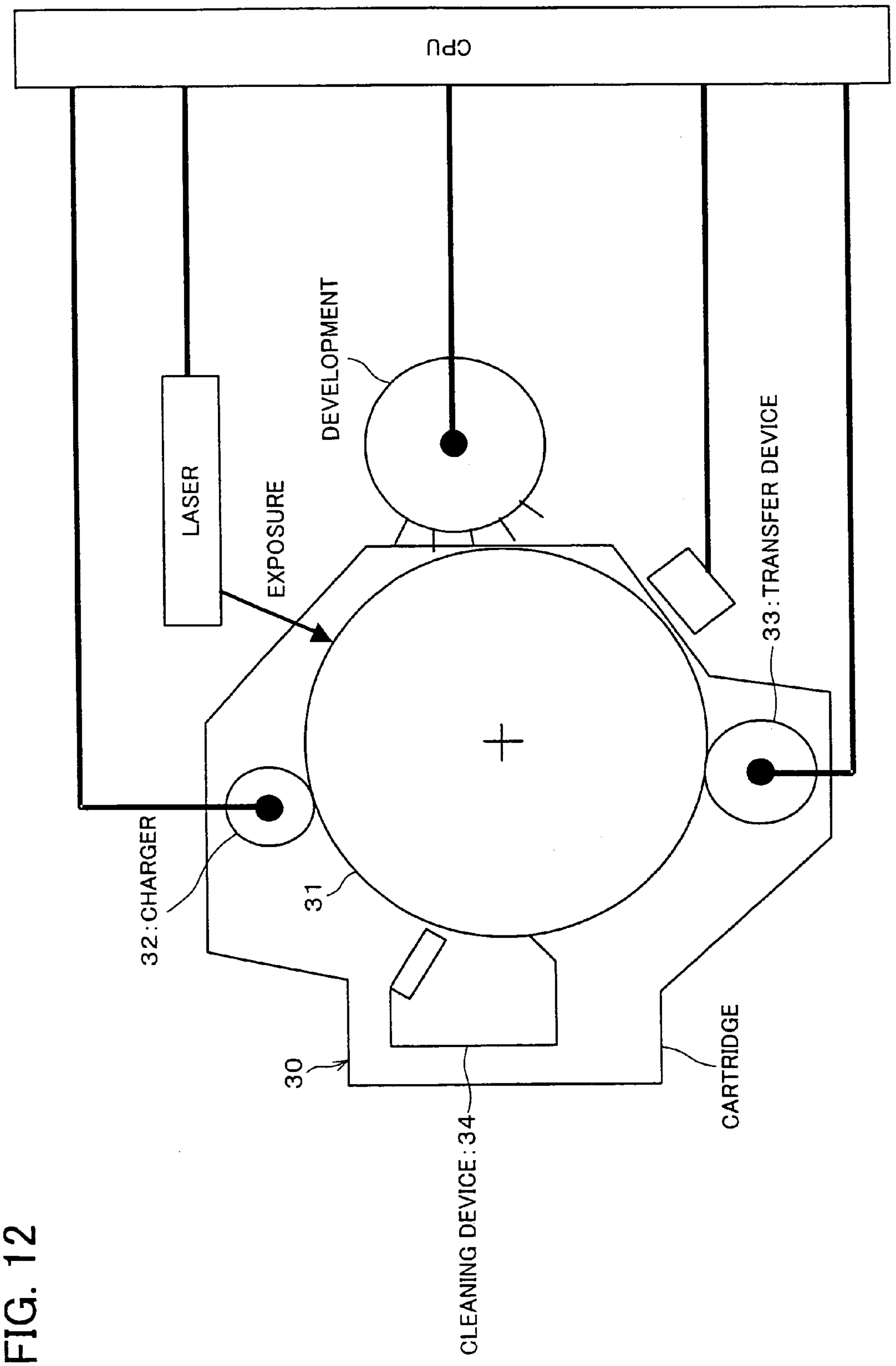
FIG. 12 is a block diagram showing a replaceable unit of a recording section.
Figure 13:
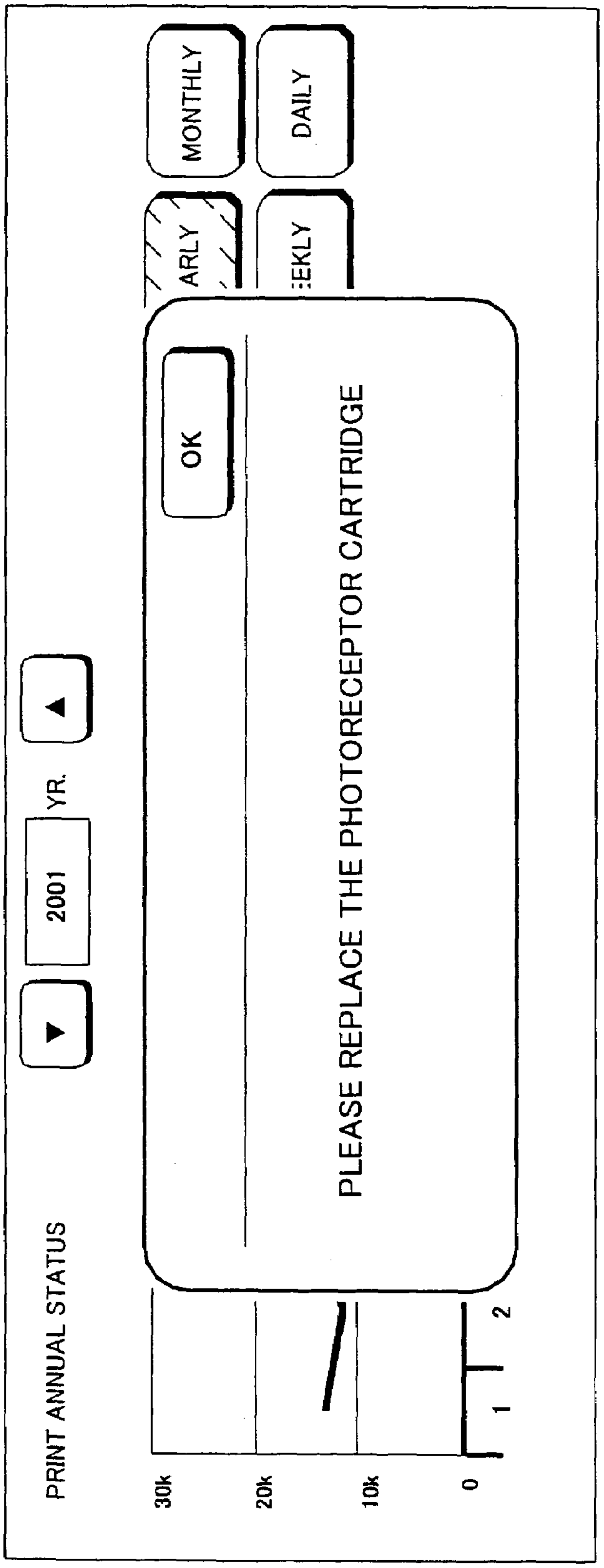
FIG. 13 is a plan view of the display section showing graphic display of an annual operating status (print counts), recommending checking an expendable.

The automatic adjustment of the electrophotographic processes is a process in which a test image of a reference density is actually formed on a photoreceptor 31, as shown in FIG. 12, and the density of the test image is detected to judge whether the density is at an appropriate level. The density level so detected is used to control various electrophotographic processes, including an amount of charge on the photoreceptor 31, a quantity of laser beam, a supply amount of developer bias, and a transfer bias, so as to create an environment where images can be recorded with an appropriate density level. These image forming conditions are adjusted by the recording section 19, which is provided as image quality adjusting means. The recording section 19 adjusts the image forming conditions based on the information of operating status of the printing apparatus 1 managed by the managing section 11. The adjustment of image forming conditions by the recording section 19 is controlled by the CPU 18, which is provided as first control means.

More specifically, as shown in FIG. 12, a test image of a predetermined density that was actually formed on the photoreceptor 31 under predetermined conditions is detected by a photodetector (not shown), and the CPU 18 judges the density information. The results of judgment is used for the feedback control of each constituting element, so as to adjust the operating condition, for example. Note that, it is known art to change an image quality of a recorded and reproduced image by adjusting conditions of at least one of the electrophotographic processes, including charging, exposure, developing, and transfer.

The printing apparatus 1 of the present embodiment adopts such a cartridge structure that an expendable, which may be a unit involved in the electrophotographic processes in the recording section 19, can be readily replaced. Thus, an old unit only needs to be replaced with a new unit to restore the state of the recording section 19.

Such a cartridge structure of the electrophotographic process is realized by a replaceable unit 30. The replaceable unit 30, as shown in FIG. 12, is realized by a charger 32, a transfer device 33, and a cleaning device 34, which are supported together on a frame around the photoreceptor 31, which is the primary component of the electrophotographic processes, for example.

In the printing apparatus 1 of the present embodiment, the administrator is recommended to confirm and check the recording section 19 based on the information of the operating status managing table 22 of the managing section 11, before the printing apparatus 1 becomes busy. The notification is sent as time information at an appropriate timing, which may be the day before day 11 and day 25, or first thing in the morning in day 11 and day 25.

For example, when the life of replaceable unit 30 ends, the display section 20*a* of the operation panel 20 displays a message that recommends the administrator to replace the replaceable unit 30.

As described, the recording section 19 is provided with the expendables managing table 19*a* that manages the life of expendables in the printing apparatus 1, and a counter (not shown). The expendables managing table 19*a*, working in synchronism with the counter controls the timing of displaying the message. The display timing is controlled such that the message is displayed at a pre-set timing, which may be before or after the timing of a counter value, or at the timing of the counter value.

Generally, the lift of expendables is managed by being quantified by the number of sheets, which may be round numbers of 5,000, 10,000, and so on. It is also common to provide a small margin of error by taking into consideration various environments in which the printing apparatus 1 is used. It is therefore possible to delay the display timing of replacing the expendable according to the peak of image forming operation.

In this manner, by recommending the administrator of the printing apparatus 1 to replace the replaceable unit 30 that has turned old and needs replacement with a new one, the replaceable unit 30 can be replaced before the operation rate of the printing apparatus 1 hits the peak. As a result, the printing apparatus 1 is able to carry out an output process with optimum conditions even when a large volume of image is formed.

This ensures stable operations of the printing apparatus 1.

Note that, the foregoing described the case where the operating status of the printing apparatus 1 is projected based on the operating status in October 2001. However, the projection of operating status may be made based on managed data of several months, for example.

Further, the projection may be made on a weekly basis or a daily basis, instead of a monthly basis. That is, the unit scale of the reference data can be changed according to such factors as the operating status of the printing apparatus 1 or the management level of the printing apparatus 1.

Note that, in the present embodiment, a projection of high operation rate of the printing apparatus 1 is notified on the display section 20*a* of the operation panel 20 of the printing apparatus 1, so as to recommend replacing the replaceable unit 30 in advance. However, the present invention is not just limited to this implementation. For example, in an environment where the printing apparatus 1 is connected to the network 2, the notification can be transmitted to personal computers 4 of various destinations, such as a network administrator, an apparatus administrator, and a service center, through the NIC 13 (communicating means) of the printing apparatus 1, using an e-mail function of the printing apparatus 1.

Figure 14:
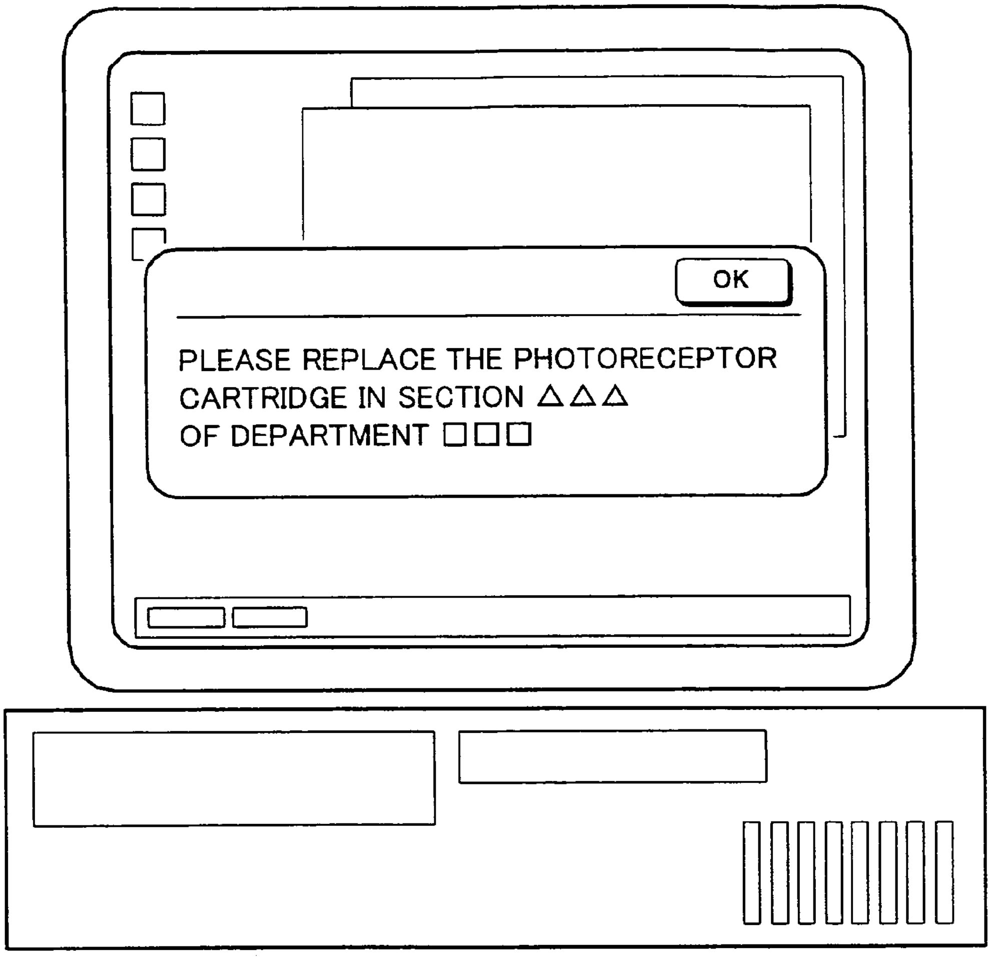
FIG. 14 is a plan view showing a display recommending an external personal computer to check the expendable.

The way the information is presented, i.e., whether the information should be displayed on the display section 20*a* of the printing apparatus 1 or transmitted to an external administrator terminal such as the personal computer 4 of the printing apparatus 1 as shown in FIG. 14 may be selected according to the system of management and the environment where the printing apparatus 1 is provided.

In the manner described above, the printing apparatus 1 of the present embodiment electronically processes an input image and outputs the processed image from the recording section 19.

In the printing apparatus 1, it is preferable to adjust an image quality of output images by adjusting image forming conditions of the recording section 19 when, for example, a predetermined number of image outputs has been made by the recording section 19. In the present embodiment, this is carried out by the recording section 19, which adjusts an image quality of output images by adjusting the image forming conditions.

Meanwhile, adjusting image forming conditions by the recording section 19 may cause a trouble for many users when the adjustment, which takes some time to complete, is carried out when the printing apparatus 1 is busy.

In the present embodiment, this is prevented by the managing section 11, which manages the operating status of the printing apparatus 1. From the information of the operating status of the printing apparatus 1 managed by the managing section 11, it is possible to grasp a period of high operation rate of the printing apparatus 1, which may be a predetermined time period of a day, week, month, or year, for example.

Further, in the present embodiment, the CPU 18 controls the recording section 19 to adjust image forming conditions based on the information of the operating status of the printing apparatus 1 managed by the managing section 11.

Thus, using the information from the managing section 11, the recording section 19 can adjust image forming conditions. That is, a projection of a future operating status of the printing apparatus 1 is made based on the past operating status, so as to cause the recording section 19 to carry out an automated image quality adjusting process before the operating status hits the peak. This is advantageous for the users because it ensures a desired level of image quality of a recorded image even when the printing apparatus 1 actually becomes busy.

By thus managing the operating status of the printing apparatus 1 and using the managed information, the printing apparatus 1 can be ensured to operate stably without arrest.

Further, in order to maintain a stable environment, the printing apparatus 1 of the present embodiment requires a regular check-up, which includes adjustment, parts replacement, and cleaning. This is troublesome from the standpoint of users, because the operations of the printing apparatus 1 need to be arrested during the check-up. It is therefore ideal to minimize the influence of check-up on the users.

In the present embodiment, this is achieved by the managing section 11, which manages the operating status of the printing apparatus 1. From the data of the operating status of the printing apparatus 1 managed by the managing section 11, it is possible to grasp a period of high operation rate of the printing apparatus 1, which may be a predetermined time period of a day, a week, a month, or a year, for example.

Further, the present embodiment includes the display section 20*a* that recommends checking-up the recording section 19. This is controlled by the CPU 18 (second control means) based on the information of the operating status of the printing apparatus 1 managed by the managing section 11.

Thus, using the information of the managing section 11 through the display section 20*a*, the printing apparatus 1 can recommend the administrator to check the recording section 19 before the operation rate increases. That is, a future operating status of the printing apparatus 1 is projected based on the past operating status, and the printing apparatus 1 causes the recording section 19 to carry out an image quality restoring process, such as a regular check-up or cleaning, before the operation rate increases. This is also advantageous for the users because it ensures a desired quality level of a recorded image even when the printing apparatus 1 is busy.

By thus managing the operating status of the printing apparatus 1 and using the managed information, the printing apparatus 1 can be ensured to operate stably without arrest.

The printing apparatus 1 of the present embodiment is further provided with an NIC 13 through which data can be sent and received to and from the externally provided personal computer 4. Via the NIC 13, the CPU 18 (second control means) notifies the personal computer 4 of information that recommend checking the recording section 19.

Thus, a notification, such as e-mail, can be sent to the personal computer 4, for example, such as a service center, via the NIC 13, to recommend checking the printing apparatus 1, even when, for example, the administrator of the printing apparatus 1 is not present at the location of the printing apparatus 1.

This is advantageous both for the administrator and the user of the printing apparatus 1 because a form of notification to confirm the expendable can be suitably selected according to the way the printing apparatus 1 is managed.

As described, in order to achieve the foregoing object, the present invention provides an image output apparatus that electronically processes input image and outputs the processes image from the recording means, the image output apparatus including: managing means for managing an operating status of the image output apparatus; notifying means for notifying the administrator of information that recommends confirmation of an expendable that is used for the image output by the recording means; and control means for controlling the notifying means to recommend the administrator to confirm the expendable, based on information of the operating status of the image output apparatus managed by the managing means.

According to the present invention, the image output apparatus electronically processes the input image and outputs the processed image from the recording means.

In the image output apparatus of the present invention, the image output from the recording means requires expendables, for example, such as a toner in the toner cartridge, recording sheets, and other replacement parts. It would be inconvenient for many users if the expendables are used up and need to be replenished or replaced when the image output apparatus is busy.

In order to prevent this, the present invention provides the managing means that manages the operating status of the image output apparatus. Using the data of the operating status of the image output apparatus managed by the managing means, it is possible to grasp a period of high operation rate of the image output apparatus, which may be a period of a day, a week, a month, or a year, for example.

Further, in the present invention, the control means controls the notifying means to recommend the administrator to confirm the expendable, based on the information of the operating status of the image output apparatus managed by the managing means.

Thus, using the information of the managing means, the notifying means can recommend the administrator to confirm if there is enough expendable left for the recording means to output images, before the operation rate of the image output apparatus increases.

That is, according to the present invention, a projection of a future operating status of the image output apparatus is made based on the past operating status, so as to recommend confirming the expendable before the operating status hits the peak. This enables the administrator to confirm a remaining amount of toner or a stock of sheets or replacement parts in advance, thereby minimizing the arrest of operations due to a shortage of expendable. This is advantageous both for the administrator and the user of the image output apparatus.

As a result, the image output apparatus of the present invention is provided that manages its operating status so as to ensure, based on the managed information, stable operations without arrest.

In the foregoing image output apparatus of the present invention, the recording means includes confirmation means for confirming a remaining amount of the expendable, and the control means controls a notification timing of the notifying means based on the remaining amount of the expendable confirmed by the confirmation means.

In one aspect of the invention as described above, the administrator is simply asked to confirm the expendable based on the information of the operating status of the image output apparatus managed by the managing means, but not directly from the information of remaining quantity of the expendable. Thus, in the event where the toner has been replenished only recently for example, it is not necessarily required to recommend the administrator to confirm the expendable, even when the operation rate is expected to increase.

In another aspect of the invention, however, the recording means includes confirmation means for confirming a remaining amount of the expendable, and the control means controls a notification timing of the notifying means based on the remaining amount of the expendable confirmed by the confirmation means.

Thus, in addition to projecting a future operating status of the image output apparatus based on the past operating apparatus, it is possible to control the notification timing of controlling the expendable, as required, based on the remaining amount of the expendable.

The image output apparatus of the present invention further includes: communication means for sending and receiving data to and from an external electronic device, the control means controlling the communication means, so as to notify the administrator of information that recommends confirmation of the expendable or the remaining amount of the expendable via the communication means with respect to the external electronic device.

According to this aspect of the invention, the image output apparatus includes the communication means for sending and receiving data to and from an external electronic device, and the control means notifies the administrator of information that recommends confirmation of the expendable or the remaining amount of the expendable via the communication means with respect to the external electronic device.

Thus, a notification, such as e-mail, can be sent to an electronic device, for example, such as a service center, via the communication means, so as to notify the administrator of information that recommends confirmation of the expendable or of the remaining amount of the expendable, even when, for example, the administrator of the image output apparatus is not present at the location of the image output apparatus.

This is advantageous both for the administrator and the user of the image output apparatus because, in this way, the information that recommends confirming the expendable and the information that recommends confirming a remaining amount of the expendable can be set according to the way the image output apparatus is managed.

As described, in order to achieve the foregoing object, the present invention provides an image output apparatus that electronically processes input image and outputs the processes image from the recording means, the image output apparatus including: managing means for managing an operating status of the image output apparatus; image quality adjusting means for adjusting image forming conditions of the recording means, so as to adjust an image quality of the output image; and first control means for controlling the image quality adjusting means, so as to adjust the image forming conditions of the recording means based on the information of the operating status of the image output apparatus managed by the managing apparatus.

According to this aspect of the invention, the image output apparatus electronically processes the input image and outputs the processed image from the recording means.

In the image output apparatus, it is preferable to adjust an image quality of output images by adjusting image forming conditions of the recording means when, for example, a predetermined number of image outputs has been made by the recording means. In a preferred embodiment, this is carried out by the recording means, which adjusts an image quality of output images by adjusting the image forming conditions.

Meanwhile, adjusting image forming conditions by the recording means may cause a trouble for many users when the adjustment, which takes some time to complete, is carried out when the image output apparatus is busy.

In order to avoid this, the present invention includes the managing means that manages the operating status of the image output apparatus. Using the data of the operating status of the image output apparatus managed by the managing means, it is possible to grasp a period of high operation rate of the image output apparatus, which may be a period of a day, a week, a month, or a year, for example.

Further, in the present invention, the first control means controls the image quality adjusting means, so as to adjust image forming conditions of the recording means, based on the information of the operating status of the image output apparatus managed by the managing means.

Thus, using the information of the managing means, the image quality adjusting means can adjust the image forming conditions of the recording means before the operation rate of the image output apparatus increases. That is, a projection of a future operating status of the image output apparatus is made based on the past operating status, so as to cause the recording means to carry out an automated image quality adjusting process before the operating status hits the peak. This is advantageous for the users because it ensures a desired image quality level of a recorded image even when the operation rate of the image output apparatus becomes actually high.

As a result, the image output apparatus of the present invention is prevented that manages its operating status so as to ensure, based on the managed information, stable operations without arrest.

As described, in order to achieve the foregoing object, the present invention provides an image output apparatus that electronically processes input image and outputs the processes image from the recording means, the image output apparatus including: managing means for managing an operating status of the image output apparatus; notifying means for notifying the administrator of information that recommends checking the recording means; and second control means for controlling the notifying means to notify the administrator of information that recommends checking the recording means.

According to this aspect of the invention, the image output apparatus electronically processes the input image and outputs the processed image from the recording means.

Further, in order to maintain a stable environment, the image output apparatus requires a regular check-up, which includes adjustment, parts replacement, and cleaning. This is troublesome from the standpoint of users, because the operations of the image output apparatus needs to be arrested during the check-up. It is therefore ideal to minimize the influence of check-up on the users.

In order to avoid this, the present invention includes the managing means that manages the operating status of the image output apparatus. Using the data of the operating status of the image output apparatus managed by the managing means, it is possible to grasp a period of high operation rate of the image output apparatus, which may be a period of a day, a week, a month, or a year, for example.

Further, the present invention includes the notifying means that notifies the administrator of information that recommends checking the recording means, and the second control means controls the notifying means to recommend the administrator to check the recording means based on the information of the operating status of the image output apparatus managed by the managing means.

Thus, using the information of the managing means, it is possible to recommend the administrator via the notifying means to check the recording means before the operation rate of the image output apparatus increases. That is, a projection of a future operating status of the image output apparatus is made based on the past operating status, so as to cause the recording means to carry out an image quality restoring process, such as a regular check-up or cleaning, before the operating status hits the peak. This is advantageous for the users because it ensures a desired image quality level of a recorded image even when the operation rate of the image output apparatus becomes actually high.

As a result, the image output apparatus of the present invention is provided that manages its operating status so as to ensure, based on the managed information, stable operations without arrest.

The image output apparatus of the present invention further includes: communication means for sending and receiving data to and from an external electronic device, and the second control means notifies the administrator of information that recommends checking the recording means via the communication means with respect to the external electronic device.

According to this aspect of the invention, the image output apparatus includes communication means for sending and receiving data to and from an external electronic device, and the second control means notifies the administrator of information that recommends checking the recording means via the communication means with respect to the external electronic device.

Thus, a notification, such as e-mail, can be sent to an electronic device, for example, such as a service center, via the communication means, so as to notify the administrator of information that recommends checking the image output apparatus, even when, for example, the administrator of the image output apparatus is not present at the location of the image output apparatus.

This is advantageous both for the administrator and the user of the image output apparatus because, in this way, the information that recommends confirming the expendable can be set according to the way the image output apparatus is managed.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image output apparatus, comprising:

image processing means for electronically processing an input image;

recording means for outputting the processed image;

managing means for managing an operating status of the image output apparatus and for using the operating status to predict a predicted high operation rate period which is a peak period, based on the operating status of the image output apparatus; and maintenance control means for controlling the image output apparatus based on information of the operating status of the image output apparatus managed by the managing means, so as to notify an administrator of the image output apparatus, before the predicted high operation rate period, of information that relates to maintenance of the image output apparatus wherein stable operation during the high operation rate period is provided.

2. The image output apparatus as set forth in claim 1, further comprising:

notifying means for notifying the administrator of information that recommends confirmation of an expendable that is used for the image output by the recording means, the maintenance control means controlling the notifying means to recommend confirmation of the expendable, based on the information of the operating status of the image output apparatus.

3. The image output apparatus as set forth in claim 2, wherein:

the recording means includes confirmation means for confirming a remaining amount of the expendable, and the maintenance control means controls a notification timing of the notifying means based on the remaining amount of the expendable confirmed by the confirmation means.

4. The image output apparatus as set forth in claim 3, further comprising:

communication means for sending and receiving data to and from an external electronic device, the maintenance control means controlling the communication means, so as to notify the administrator of information that recommends confirmation of the expendable or the remaining amount of the expendable via the communication means with respect to the external electronic device.

5. The image output apparatus as set forth in claim 2, further comprising:

communication means for sending and receiving data to and from an external electronic device, the maintenance control means controlling the communication means, so as to notify the administrator of information that recommends confirmation of the expendable or of a remaining amount of the expendable via the communication means with respect to the external electronic device.

6. The image output apparatus as set forth in claim 2, wherein the maintenance control means, based on the information of the operating status of the image output apparatus, controls the notifying means to recommend the administrator to check the recording means.

7. The image output apparatus as set forth in claim 6, further comprising:

communication means for sending and receiving data to and from an external electronic device, the maintenance control means controlling the communication means, so as to notify the administrator of information tat recommends checking the recording means via the communication means with respect to the external electronic device.

8. The image output apparatus as set forth in claim 1, further comprising:

communication means for sending and receiving data to and from an external electronic device, the maintenance control means controlling the communication means, so as to notify the administrator of information that recommends confirmation of an expendable or of a remaining amount of the expendable via the communication means with respect to the external electronic device.

9. The image output apparatus as set forth in claim 1, further comprising:

image quality adjusting means for adjusting image forming conditions of the recording means, so as to adjust an image quality of the output image, the maintenance control means controlling the image quality adjusting means, so as to adjust the image forming conditions of the recording means based on the information of the operating status of the image output apparatus.

10. The image output apparatus as set forth in claim 9, further comprising:

communication means for sending and receiving data to and from an external electronic device, the maintenance control means controlling the communication means, so as to notify the administrator of information that recommends checking the recording means via the communication means with respect to the external electronic device.

11. The image output apparatus as set forth in claim 1, further comprising:

communication means for sending and receiving data to and from an external electronic device, the maintenance control means controlling the communication means, so as to notify the administrator of information that recommends checking the recording means via the communication means with respect to the external electronic device.

12. The image output apparatus as set forth in claim 3, wherein:

the administrator is not notified before the predicted high operation rate period if the remaining amount of the expendable is judged to be sufficient for the predicted high operation rate period.

* * * * *